US007086138B2

United States Patent
Anderson

(10) Patent No.: US 7,086,138 B2
(45) Date of Patent: Aug. 8, 2006

(54) METHOD OF FORMING A FEATURE HAVING A HIGH ASPECT RATIO

(75) Inventor: Paul E. Anderson, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 261 days.

(21) Appl. No.: 09/972,699

(22) Filed: Oct. 5, 2001

(65) Prior Publication Data

US 2002/0067572 A1 Jun. 6, 2002

Related U.S. Application Data

(60) Provisional application No. 60/238,743, filed on Oct. 6, 2000.

(51) Int. Cl.
*G11B 5/127* (2006.01)
*H05K 3/10* (2006.01)

(52) U.S. Cl. ................................ 29/603.07; 29/603.12; 29/603.13; 430/314; 205/667; 360/119; 360/122; 427/98; 427/132

(58) Field of Classification Search .............. 29/603.07, 29/603.12, 603.13, 603.15, 603.16, 603.18, 29/603.23; 430/314, 319, 320; 205/667; 360/119, 360/122, 125; 427/96, 98, 129, 132
See application file for complete search history.

(56) References Cited

U.S. PATENT DOCUMENTS

| 6,018,862 | A | 2/2000 | Stageberg et al. ... 29/603.07 X |
| 6,024,886 | A | 2/2000 | Han et al. ............... 430/320 X |
| 6,218,080 | B1 * | 4/2001 | Wu et al. ................... 430/314 |

FOREIGN PATENT DOCUMENTS

JP          3-125308      * 5/1981 ................. 360/122

OTHER PUBLICATIONS

Yoda et al, "Self–Alignment Trench–Pole Writer", IEEE Transactions on Magnetics, vol. 35, Issue 5, pp. 2535–2537, Sep. 1999.*

* cited by examiner

*Primary Examiner*—A. Dexter Tugbang

(57) ABSTRACT

A method for forming high aspect ratio metallization on a wafer is implemented in the formation of a disc drive recording head. The process involves patterning photoresist where metal is to be later deposited, milling around the photoresist perimeter, depositing insulating material in the milled region, around and over the photoresist, then dissolving the photoresist to be replaced with metal. The process features the ability to desirably increase the aspect ratio of height to width of a metallization on a wafer. An improved aspect ratio can be utilized to improve the quality of a write pole in a recording head, effectively increasing its achievable recording density.

6 Claims, 6 Drawing Sheets

METHOD OF FORMING A FEATURE HAVING A HIGH ASPECT RATIO

RELATED APPLICATIONS

This application claims priority of U.S. provisional application Ser. No. 60/238,743, entitled "Method of Forming High Aspect Ratio Metallization" filed Oct. 6, 2000.

FIELD OF THE INVENTION

This application relates generally to the process of forming a high aspect ratio patterned feature on a wafer using a unique combination of standard thin film processing techniques, and, more particularly, to implementing the patterned feature as a writer pole for a thin film magnetic recording head.

BACKGROUND OF THE INVENTION

Disc drives are data storage devices that store digital data in magnetic form on a rotating storage medium called a disc. Modern disc drives comprise one or more rigid discs that are coated with a magnetizable medium and mounted on a hub of a spindle motor for rotation at a constant high speed. Generally, each of the multiple discs in a disc drive has associated with it two heads (one adjacent the top surface of the disc, and another adjacent the bottom) for magnetically reading and writing data from and to the disc respectively. A typical disc drive has one or two discs. This usually means there are one to four heads in a disc drive carried by a set of actuator arms. Data is accessed by moving the heads from the inner to the outer part of the disc (and vice-versa) driven by an actuator assembly. Recording heads consist of two elements: a read element, or reader, and a write element, or writer. During a write operation, current is passed through the writer coils, generating a magnetic field that leaves a magnetic signature on the disc. During a read operation, an existing magnetic signature on the disc induces a current in the reader.

The writer element of a recording head is typically composed of a soft magnetic yoke encircled by coils and broken by a gap in the magnetic material, commonly referred to as the write gap. The portion of yoke containing the writer gap is exposed at the air bearing surface where it is referred to as the poles or pole tips. In various applications, including recording heads, it is desirable to construct features having a high aspect ratio. That is, the height (direction of film growth) of the feature, in this case a thin line, is much greater than its width (patterned dimension). For the purpose of recording heads in disc drives, the aspect ratio of the thin conductive line directly relates to the bit density of recorded data on the magnetizable medium. As the thickness of the conductive line decreases, and as its aspect ratio of height to width increases, the achievable bit density in recording increases. The storage capacity of a disc drive is therefore greater. It is accordingly desirable to form a high aspect ratio feature in the most efficient way.

One conventional high aspect ratio features such as conductive thin lines on wafers is as follows. First, a wafer is coated with photoresist. The photoresist material is selectively exposed to light and developed to form a photoresist pattern. In the developing process exposed areas of the photoresist are removed to create a pattern, specifically trenches, in which the feature will be formed. The resultant trench is then filled, typically by electroplating with the writer component material. The remaining photoresist is then removed, the feature is milled to form a notch in the shared pole, and an insulating material is deposited.

Using such a technique it is very difficult to form a trench within precise parameters and to control the angle of the walls of the trench. During the dissolving process, unexposed photoresist is consumed by the developing solution so the dimensions of the trench and the angle of its sidewalls are subject to inaccuracies. These parameters need to be carefully controlled if a high aspect ratio is to be achieved such as in order to create a thin, conductive line which can be used as a write pole for a disc drive head. As a result, the width of the trench becomes larger than was intended, and the desired high aspect ratio of a thin line is not achieved.

Accordingly there is a need to improve the conventional approach for a forming a high aspect ratio thin conductive line on a wafer.

SUMMARY OF THE INVENTION

Against this backdrop the present invention has been developed. The present invention is essentially a method of forming a high aspect ratio thin line on a wafer. The process involves first depositing writer gap and pole materials as a sheet film, patterning a temporary photoresist feature, milling to define a notch in the shared pole, applying insulating material adjacent to the writer material, polishing to expose the photoresist, removing the photoresist, and filling the resultant trench with the final writer component material.

According to a first aspect of the present invention, there is provided a method for forming a writer pole having a high aspect ratio. The method includes steps of:

(a) plating a shared pole extension on a wafer;

(b) depositing write gap material over the shared pole extension;

(c) depositing a first top pole seed layer over the write gap material;

(d) depositing a layer of photoresist over the substrate;

(e) patterning a first top pole area in the layer of photoresist;

(f) exposing the photoresist layer to create a feature having a high aspect ratio (g) forming a notch in the shared pole by milling through the first top pole seed layer, write gap material, and into the shared pole extension;

(h) depositing a layer of insulator over the wafer;

(i) polishing the top surface of the wafer after step (h) to expose a top of the feature;

(j) stripping the photoresist occupying the feature; and (k) plating the feature with a conductive material.

According to a second aspect of the present invention, there is provided a method for forming a high aspect ratio feature on a wafer. The method involves the steps of:

(a) depositing a layer of photoresist on a substrate;

(b) patterning a line in the photoresist and exposing the photoresist so that photoresist only remains in the line;

(c) depositing an insulator layer over the entire substrate;

(d) polishing the insulator layer deposited in step (c) to expose the photoresist remaining in the patterned line area; and (e) removing the photoresist in the patterned line area.

According to a third aspect of the present invention, there is provided a write head including:

a shared pole extension;

a high aspect ratio writer top pole located over the shared pole extension, the high aspect ratio writer pole formed by the steps of:

(a) patterning a top pole area with photoresist material;

(b) exposing the patterned photoresist material so that photoresist only remains in the top pole area;

(c) depositing an insulator layer over the substrate;

(d) polishing the insulator layer deposited in step (c) to expose the photoresist;

(e) stripping the photoresist occupying the top pole area; and (f) plating the first top pole area with a conductive material.

According to a fourth aspect of the present invention, there is provided a write head comprising a shared pole extension; a high aspect ration writer top pole located over the shared pole extension, the high aspect ratio writer pole formed by the steps of:

(a) depositing a layer of photoresist on a substrate;

(b) patterning a line in the photoresist;

(c) depositing a thick insulator over the entire substrate;

(d) polishing the top surface of the insulator deposited in step (c) to expose the photoresist remaining in the patterned line area;

(e) removing the photoresist in the patterned line area; and (f) plating the patterned line area with a conductive material to form the high aspect ratio conductive line.

These are preferred embodiments by which this can be achieved that is presently envisioned. However, other means will also become apparent to those skilled in the art upon reading the following description. Essentially, a thin line is formed on a wafer by depositing material in a trench formed by insulating material formed around a subsequently removed photoresist. These and various other features as well as advantages that characterize the present invention will be apparent from a reading of the following detailed description and a review of the associated drawings.

DETAILED DESCRIPTION

Figure 1:
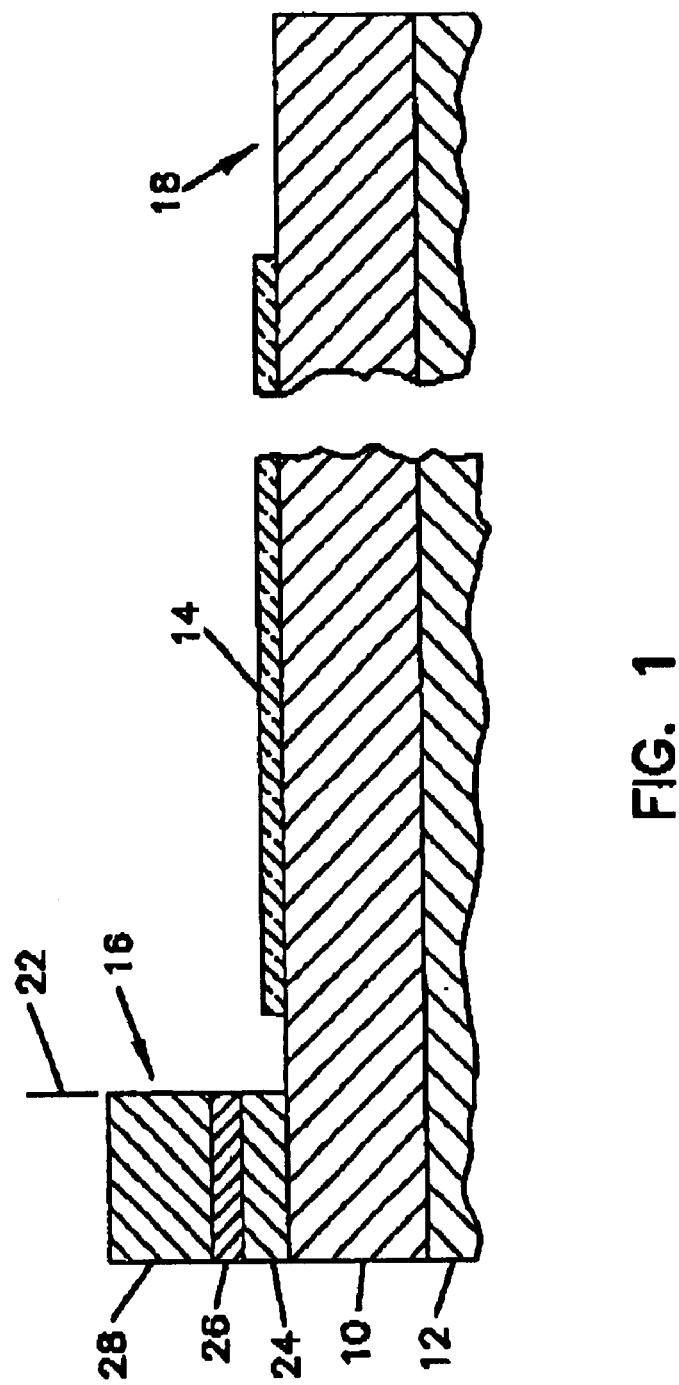
FIGS. 1–2 are sectional views illustrating various construction stages of an inductive write head according to the prior art.
Figure 2:
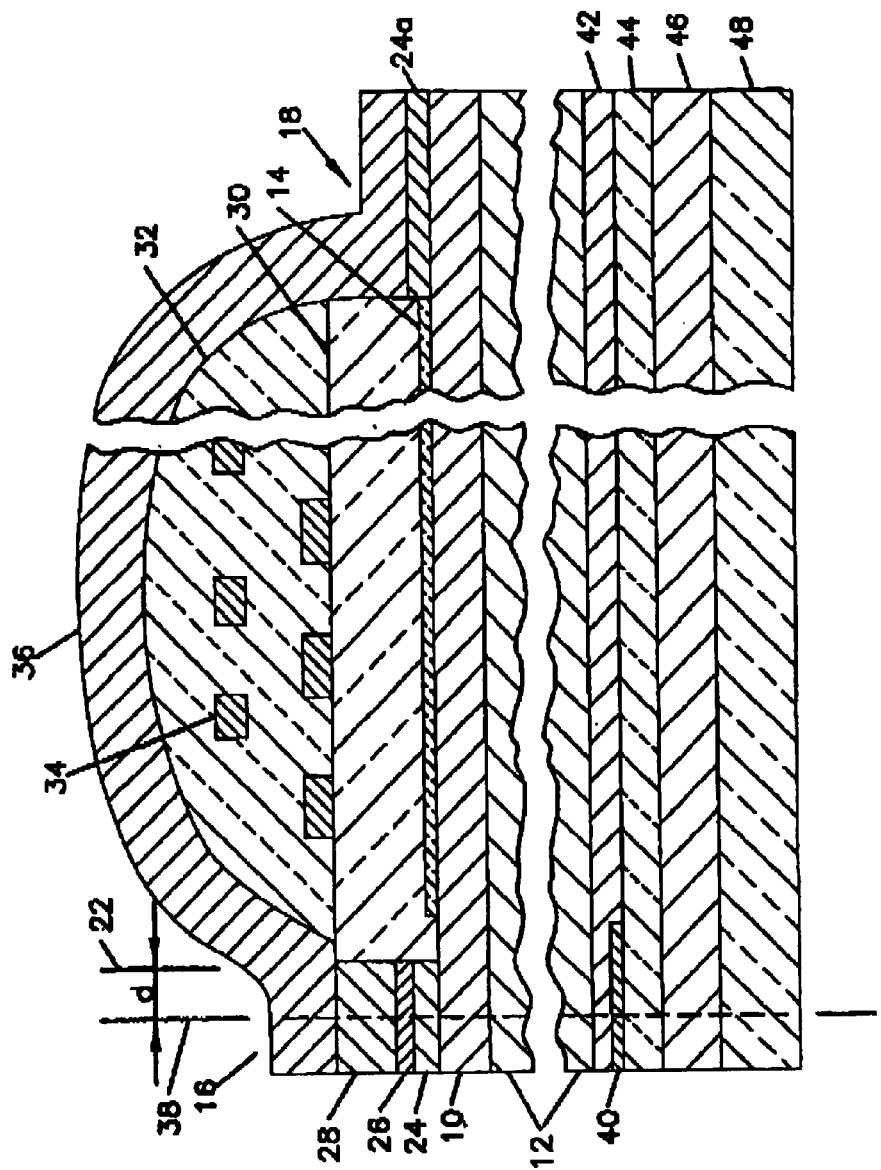

FIGS. 1–2 are sectional views illustrating various construction stages of an inductive write head according to the prior art. As shown at FIGS. 1–2, a layer 10 of magnetic material, such as permalloy, is formed on substrate 12. Layer 10 will form the lower pole piece of the thin-film inductive magnetic transducing head being fabricated. The inductive write transducer may be a part of a read/write head employing a magnetoresistive (MR) read head (not shown). In such a case, substrate 12 may be a reader isolation layer formed of a metal oxide such as alumina or silicon dioxide, and layer 10 will serve the dual function as a shield for the MR head, as well as the bottom pole for the inductive head. Thus, layer 10 is known in the trade as a shared pole. If desired, a protective layer 14 is formed on the exposed surface of magnetic layer 10, and is patterned as to expose the top surface of layer 10 in a region that encompasses a pole tip region 16. By way of example, layer 14 may be a metal oxide, such as alumina, that is sputter-deposited onto the exposed surface of layer 10 and etched, using a photoresist mask and etchant, to expose layer 10 at the pole tip region 16. Layer 14 does not extend into pole tip region 16.

Figure 5:
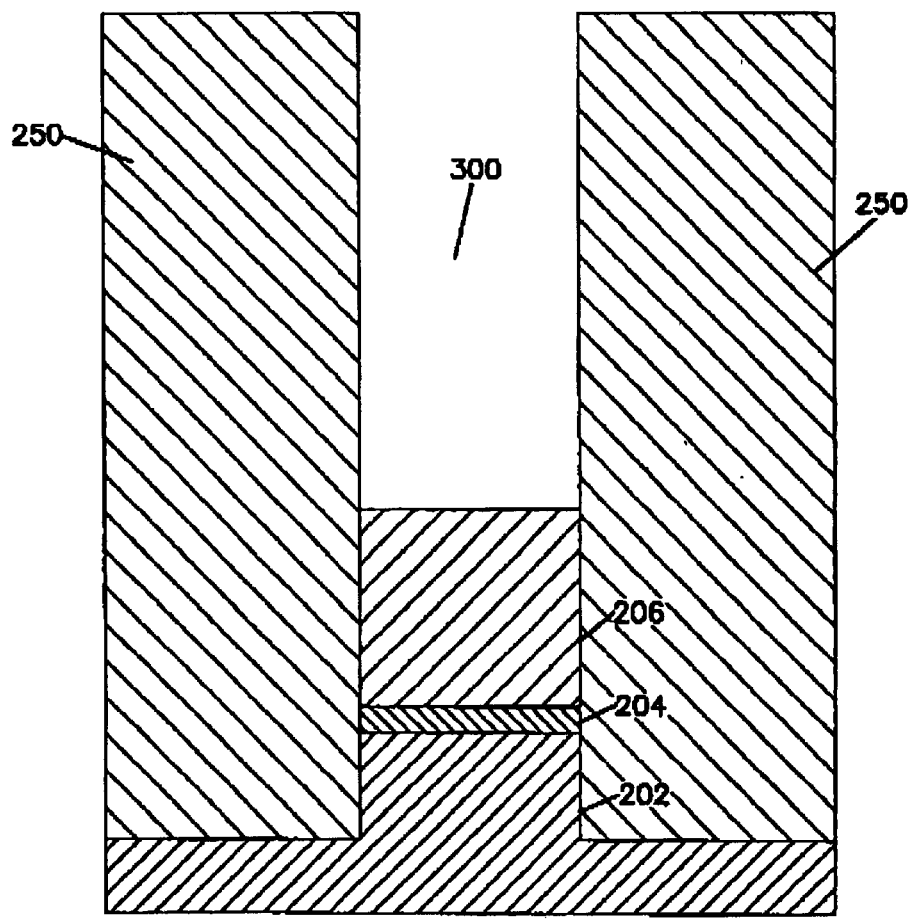
Figure 6:
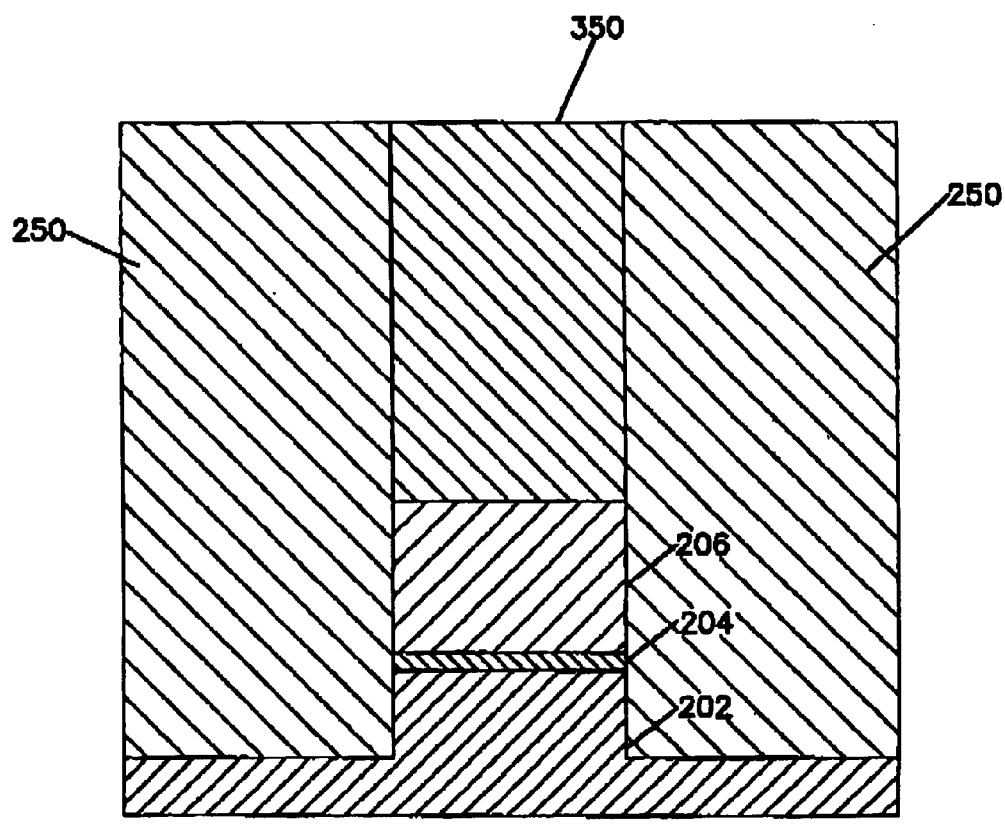

A conventional approach to forming the first top pole tip structure 16 is to deposit a magnetic layer 24, a writer gap layer 26, and an additional magnetic layer (a fraction of 28). A patterned photoresist mask is then used to define the width of the first top pole tip region 16 to the zero throat level 22. Additional magnetic material, such as permalloy, is plated in the photoresist trench to complete layer 28. The photoresist is then removed, and the plated feature is milled, transferring the plated pattern back through layers 26 and 24. FIG. 5 illustrates conventional processing as described thusfar.

Next, as illustrated particularly in FIG. 2, the insulator and coil structure are formed in the back region of the head and comprise layers of insulating material 30, 32 encapsulating convolutions 34 of an electric coil, with a top magnetic pole 36, preferably formed of permalloy, plated over the structure and joined to the exposed surface of top pole extension 28 in the pole tip region 16, and to the exposed surface of bottom pole 10 in the back gap region 18.

Thus, the process of forming the write pole according to the prior art requires defining a trench and then plating the writer pole in the trench. Such a technique, as already explained, suffers from the inability to precisely control the parameters of the trench which direct affects the ability to form a writer pole with a high aspect ratio.

FIGS. 3–6 are cross-sectional views illustrating various construction stages of a wafer 200 or writer having a high aspect ratio feature according to a preferred embodiment of the present invention. Unlike the prior art process which starts by defining a trench in the photoresist, a preferred embodiment of the present invention instead defines a thin, temporary photoresist line first which will become the high aspect ratio feature.

The process begins by plating the wafer 200 with a shared pole extension 202. A write gap 204 is then deposited on the shared pole extension 202. A high moment first top pole seed layer 206 is then deposited on the write gap 204, all of these steps being well known to those of ordinary skill in the art.

Figure 3:
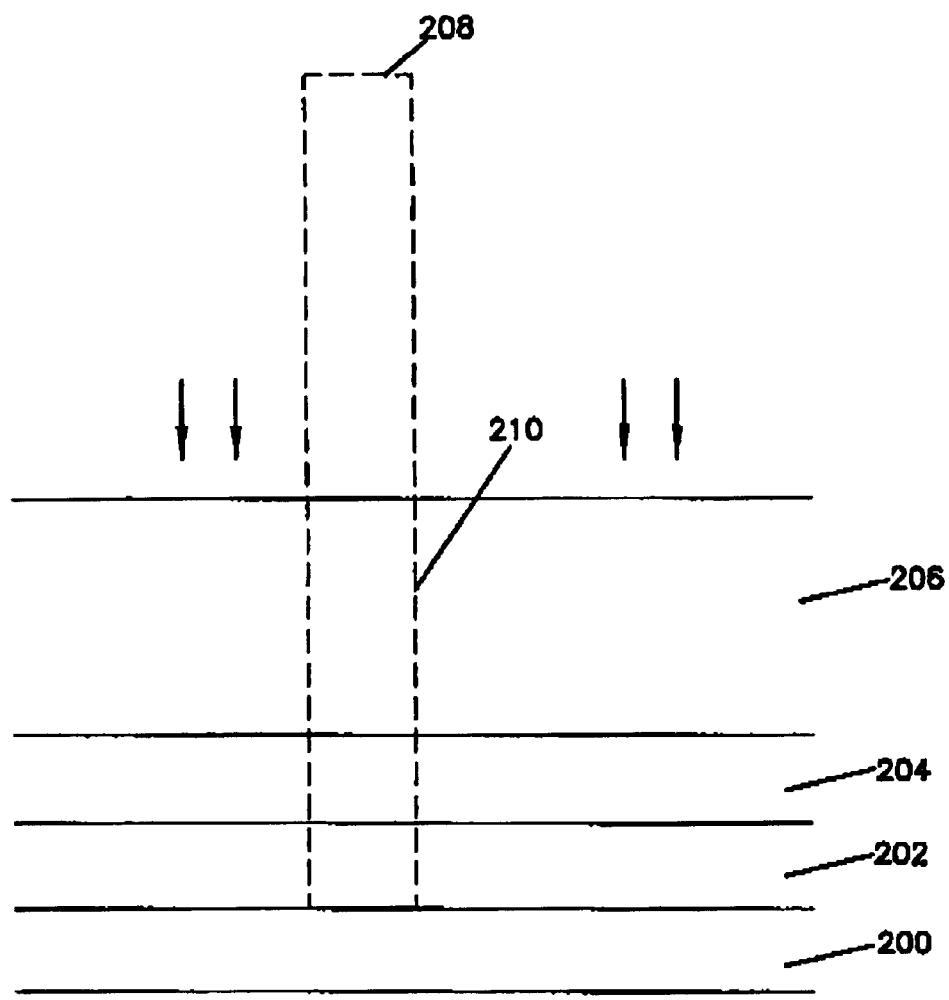
FIGS. 3–6 are cross-sectional views illustrating various construction stages of a wafer during a thin metallic line formation process according to a preferred embodiment of the present invention.

A layer of photoresist 208 is then applied to the entire wafer 200. The layer of photoresist 208 is applied with a thickness ranging from about 0.5 microns to about 5.0 microns depending on the writer design. A pattern (not shown) defining a first top pole is then defined in the photoresist and the photoresist is exposed to light and developed to form a photoresist pattern. In the developing process, unexposed areas of the photoresist are removed to create the feature as shown in FIG. 3. Next the first top pole seed layer, writer gap and a portion of the shared pole are removed by ion milling except in the area protected by the photoresist which defines the physical track width of the writer. Thus, instead of using the conventional approach of defining a trench in photoresist to form the first top pole, a preferred embodiment of the present invention defines a photoresist line 208 which will define the first top pole feature at the air bearing surface. Because the pattern formed in the photoresist is a line instead of a trench, critical parameters such as the feature's width and wall angle can be controlled. In addition, a writer pole having sub-0.2 micron width can be achieved.

Figure 4:
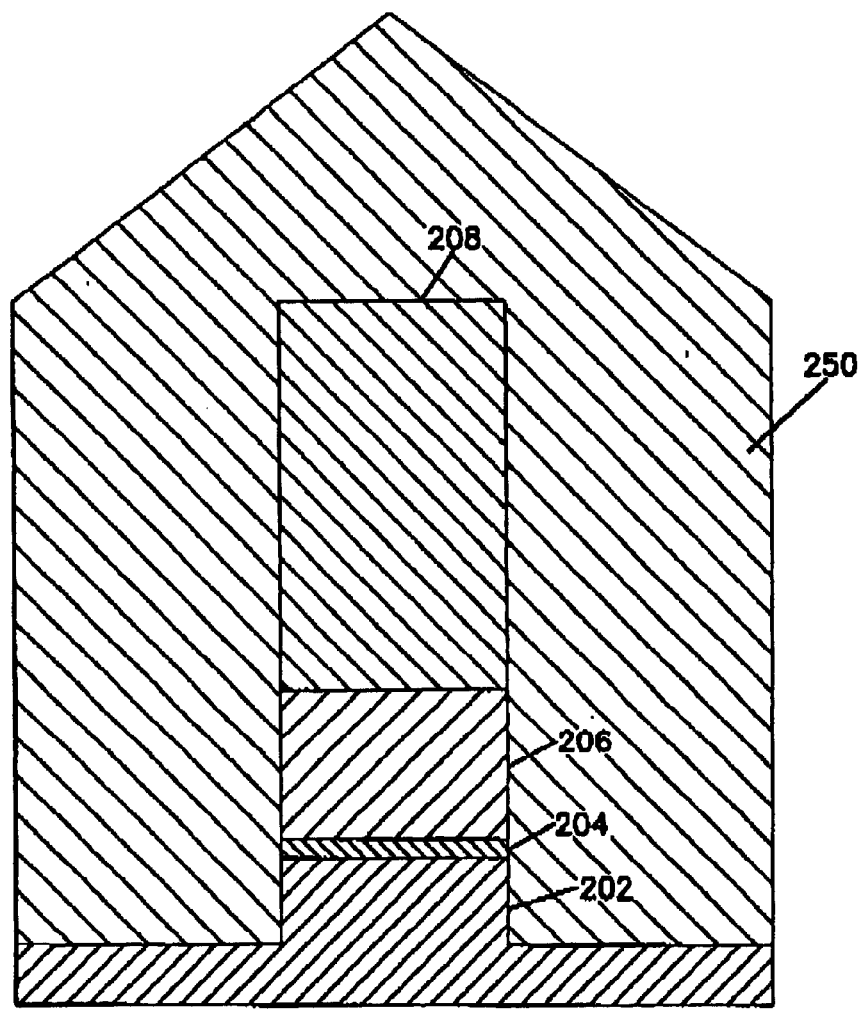

Next, a thick layer of insulator 250, as shown in FIG. 4 is deposited over the substrate. In a preferred embodiment the thickness of the layer of insulation ranges from about 1 to about 5 microns, and more preferably is about 3 microns. The insulator 250 may be any insulator such as aluminum oxide ($Al_2O_3$) or silicon dioxide ($SiO_2$) for example. The wafer is then chemically mechanically polished to expose the top of the feature defining the first top pole. The photoresist is then stripped resulting in the structure shown in FIG. 5 where a trench 300 is located where the first top pole will be.

Metal 350 is then electroplated in the trench 350 to form the first top pole. Again the structure is chemically mechanically polished resulting in the structure shown in FIG. 6.

Essentially, the process may be viewed as the steps of (a) plating a shared pole extension on a wafer, (b) depositing write gap material over the shared pole extension, (c) depositing high moment first top pole seed over the write gap material, (d) patterning a first top pole defining region with photoresist, (e) exposing the photoresist, (f) milling a notch in the shared pole (through the first top pole seed, write gap, and into the shared pole extension), (g) measuring the notch depth to ensure it meets specification, (h) depositing an insulator layer over the wafer, (i) chemical mechanically polishing the wafer to expose the top of the feature defining the first top pole, (j) stripping the photoresist occupying the first top pole area to define a trench, (k) plating the substrate in the trench to form the first top pole, and (l) chemically mechanically polishing the top surface of the wafer.

The write gap material can comprise either a conducting or nonconducting material. For non-conducting, an additional processing step between steps (c) and (d) must be added to open vials between the first top pole seed and the shared pole for a conduction path, or a conducting film can be deposited after milling the notches in step (f).

It will be clear that the present invention is well adapted to attain the ends and advantages mentioned as well as those inherent therein. While a presently preferred embodiment has been described for purposes of this disclosure, various changes and modifications may be made which are well within the scope of the present invention. Numerous other changes may be made which will readily suggest themselves to those skilled in the art and which are encompassed in the spirit of the invention disclosed and as defined in the appended claims.

What is claimed is:

1. A method for forming a magnetic structure, the method comprising:
    (a) depositing a layer of photoresist over a substrate;
    (b) patterning a first magnetic area in the photoresist layer;
    (c) removing the photoresist layer except under the first magnetic area to create a photoresist strip having a high aspect ratio;
    (d) covering the photoresist strip with an insulator layer;
    (e) removing the photoresist strip so as to form the high aspect ratio feature in the insulator layer; and
    (f) plating the high aspect ratio feature with a conductive material to form the magnetic structure.

2. The method of claim 1, further comprising plating a shared pole extension on the substrate before the step (a).

3. The method of claim 2, further comprising depositing write gap material over the shared pole extension before step (a).

4. The method of claim 3, further comprising depositing a first magnetic seed layer over a write gap material before step (a).

5. The method of claim 4, further comprising forming a notch in the shared pole extension by milling through the first magnetic seed layer, write gap material, and into the shared pole extension.

6. The method of claim 1, further comprising polishing a top surface of the substrate to expose a top of the photoresist strip before the step of removing the photoresist strip.

* * * * *